Patented Jan. 8, 1935

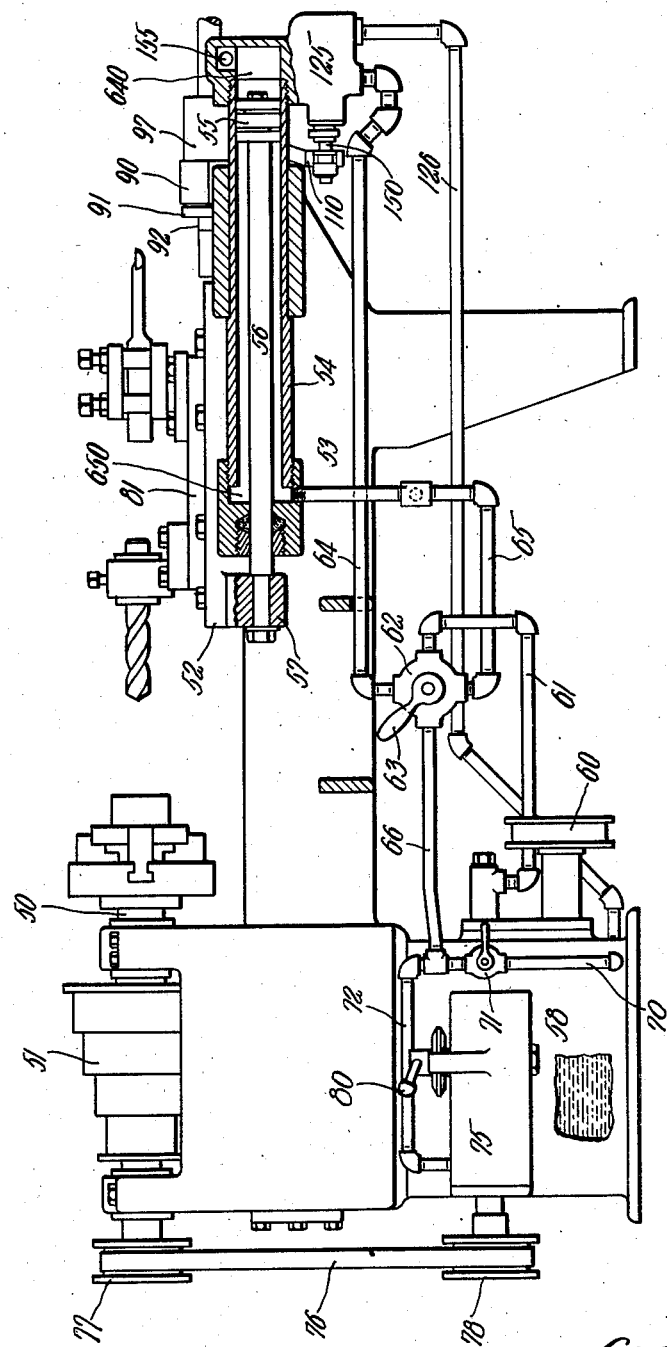

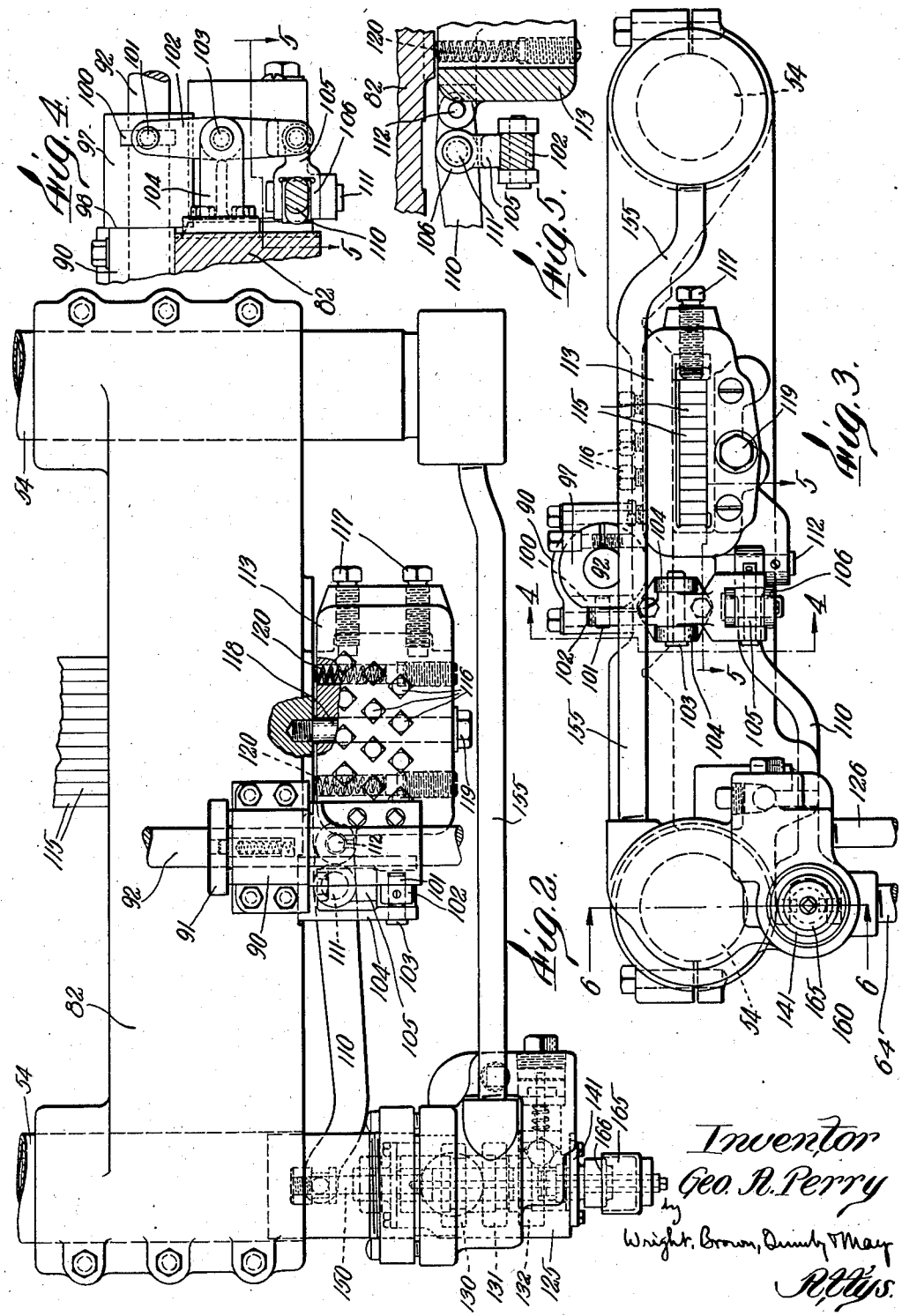

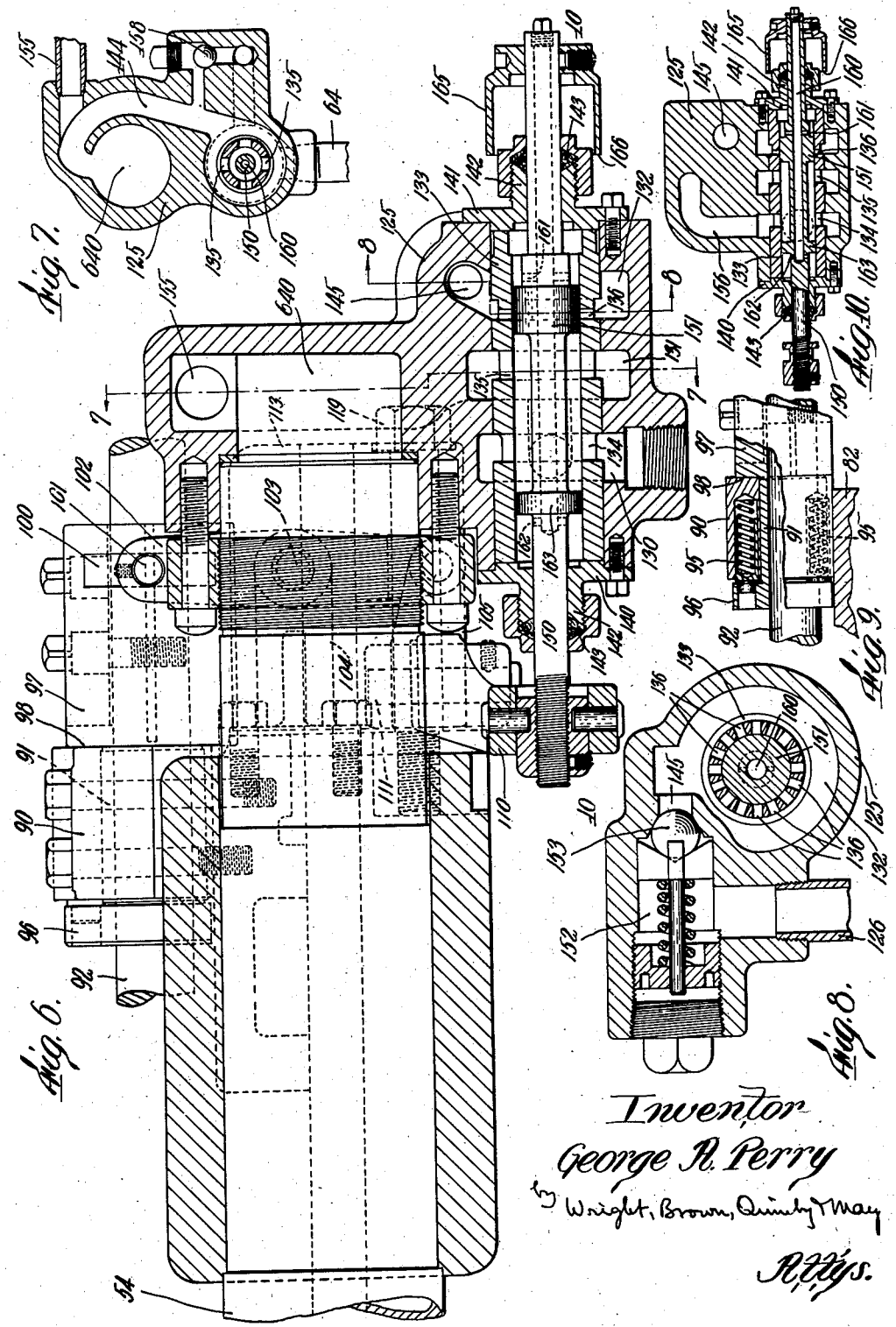

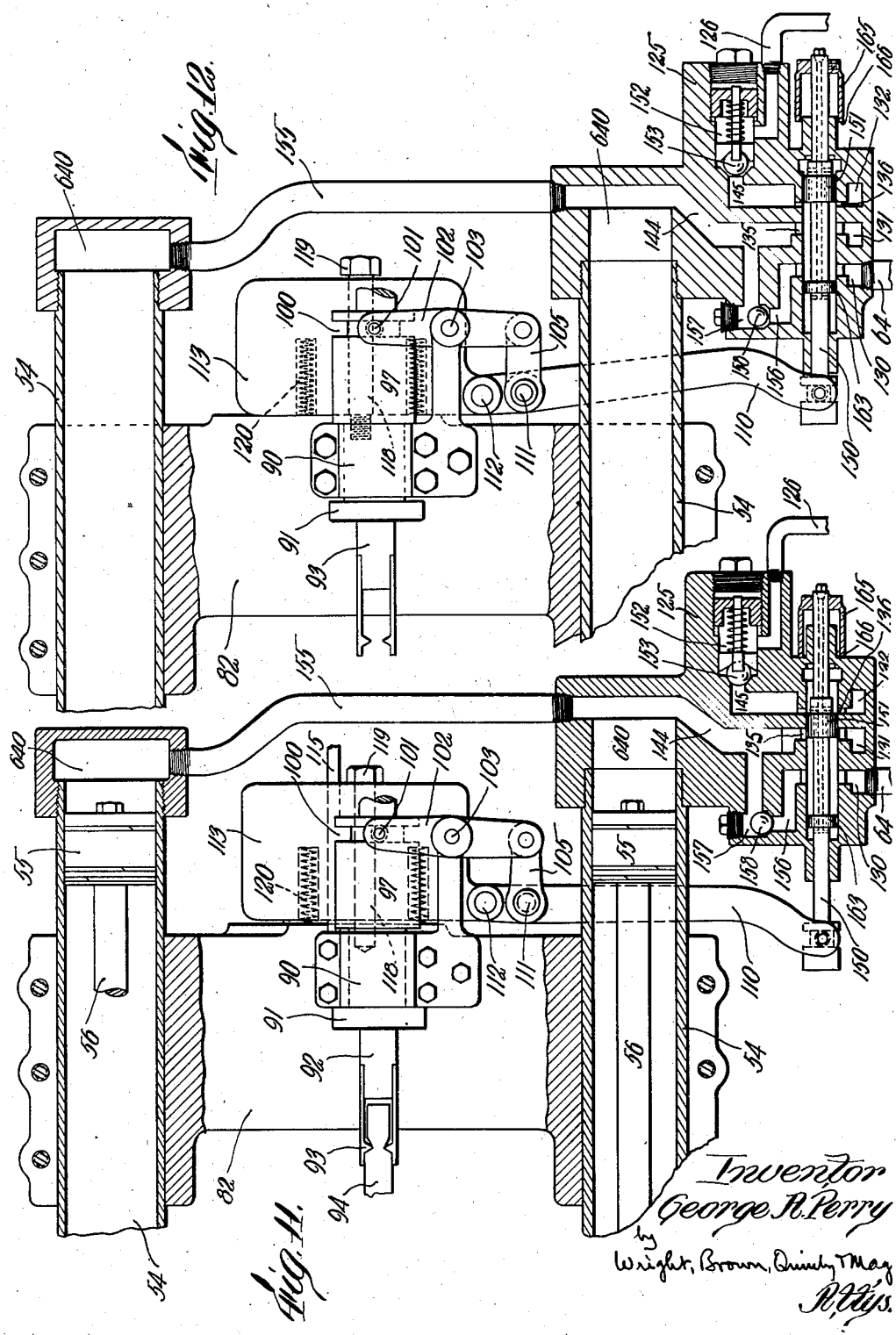

1,986,848

UNITED STATES PATENT OFFICE 1,986,848

AUTOMATIC CONTROL FOR HYDRAULIC FEED MECHANISM

George A. Perry, Springfield, Vt., assignor to Jones & Lamson Machine Company, Springfield, Vt., a corporation of Vermont Application January 5, 1932, Serial No. 584,806

15 Claims. (Cl. 29—42)

This invention relates to automatic control mechanism for the operation of a fluid motor. The invention relates more particularly to hydraulic mechanism for reciprocating the saddle or tool carriage of a turret lathe. In a lathe of this type, a number of tools are customarily mounted on a revoluble turret and are presented in succession to the work which is revolved in a suitable chuck. To this end, the saddle, on which the turret is mounted, reciprocates back and forth, its cycle of motions usually being a rapid motion toward the work to bring a tool into initial cutting position, followed by a slow feed of the saddle toward the work while the tool is cutting, then at the end of a cutting operation, rapid movement away from the work, the latter portion of this movement of the saddle away from the work resulting in a turning of the turret on the saddle by well known mechanism in order to align the next successive tool with the work. The motion of the saddle during the turning of the turret should be relatively slow so as to avoid undue stresses on the parts of the lathe.

It is an object of the present invention to provide automatic control means for two primary objects in the operation of hydraulic feeding means for a saddle. The invention is herein illustrated and more particularly described as embodied in a turret lathe, the saddle of which is moved back and forth by a piston sliding in a fixed cylinder and actuated by power fluid under pressure supplied to one end or the other of the cylinder. The direction of motion of the saddle may be controlled by a suitable hand valve or otherwise. An object of the present invention is to provide automatic means operable to relieve to some extent the fluid pressure in the cylinder which is being supplied thereto to produce the feeding motion of the saddle when any cutting operation of a tool is terminated by the engagement of the saddle, or some member carried thereby, with a corresponding stop bar. This reduction of pressure is preferably sufficient to save the stop bars and associated mechanism from injury, but at the same time sufficient pressure is maintained to hold the tool firmly against the work at the completion of the cutting step until the saddle is retracted by reversing the direction of fluid pressure on the piston. The second primary object of the invention is to provide automatic control mechanism for reducing the speed of movement of the saddle away from the work when the saddle reaches the point where turning movement of the turret is begun. According to the present invention, a suitable valve is mounted in the supply and discharge line for the end of the cylinder remote from the work. This valve cooperates with suitably arranged ports and passages to constrict the discharge line when the saddle reaches the point at which the turret begins to turn, so that the further progress of the piston which moves the saddle is impeded by the throttling of the discharge line. The excess of supply fluid from the pump caused by such slowing down of the piston is relieved through a suitable spring-pressed relief valve which may be conveniently adjacent to the pump discharge. According to the invention, the valve mechanism for accomplishing the two primary objects of the invention stated may be enclosed in a single casing as hereinafter more fully described.

Various improved features of structure will be apparent to one skilled in the art from the following description of an embodiment of the invention which is illustrated on the drawings, of which,—

Figure 1 is a front elevation of a turret lathe including an embodiment of the invention.

Figure 2 is a plan view of the end portion of the lathe remote from the spindle.

Figure 3 is an end elevation of the same.

Figure 4 is a section on the line 4—4 of Figure 3.

Figure 5 is a section on the lines 5—5 of Figures 3 and 4.

Figure 6 is a section on the line 6—6 of Figure 3.

Figure 7 is a section on the line 7—7 of Figure 6.

Figure 8 is a section on the line 8—8 of Figure 6.

Figure 9 is a fragmentary elevation of a portion of the automatic control mechanism, part being broken to show in section.

Figure 10 is a section on the line 10—10 of Figure 6.

Figures 11 and 12 are diagrammatic arrangements of the working parts of the automatic control mechanism, showing two positions of operation.

The embodiment of the invention illustrated on the drawings is shown as applied to an automatic turret lathe provided with hydraulic feeding means for moving the saddle. As shown in Figure 1, the lathe may include a work spindle 50 provided with a cone pulley 51 by which the spindle may be driven in the usual manner. At 52 is shown a tool slide or saddle movable on the bed 53 of the lathe toward and from the work spindle and parallel to its axis. This slide 52 is shown as moved by a hydraulic motor comprising a cylinder 54 within which is a piston 55 having a piston rod 56 projecting through an end of the cylinder. Either the cylinder 54 or the piston rod 56 is secured to and held stationary by the frame of the lathe, the other member being secured to a lug or ear 57 which forms a portion of and projects from the saddle 52. In the embodiment illustrated, the cylinder is held stationary and the piston is movable with the saddle. At 58 is a reservoir for oil or other suitable power fluid to be delivered to the cylinder 54 by means of any suitable pumping mechanism (not shown) which may be immersed in the reservoir and may be driven by any convenient means such as a pulley 60. The pumping mechanism may be similar to that described and illustrated in the United States application of Flanders Serial No. 492,745, filed November 1, 1930, the pump being preferably a Duplex pump having one portion adapted for delivering a comparatively large volume of oil at a comparatively low pressure, the other portion of the pump being adapted to deliver a smaller stream of oil at a considerably higher pressure. Associated with the pump structure as described and illustrated in the said application, there is preferably provided an automatic valve whereby a large volume of oil at low pressure is delivered to the discharge line of the pump until the back pressure in this line builds up beyond a certain point, whereupon the high pressure portion of the pump is automatically thrown into connection with the discharge line, the pumping mechanism being also provided with a spring-pressed relief valve whereby excess pressure in the pump discharge may be relieved by escape of oil directly back into the reservoir. The pump discharge line 61 leads to a conventional four-way valve 62 which is manually operable as by a handle 63. From this valve, a supply and discharge pipe 64 leads to a pressure chamber 640 in the end of the cylinder 54 remote from the work, a supply and discharge pipe 65 leading from the valve 62 to a chamber 650 in the end of the cylinder adjacent to the work. A return pipe 66 extends from the valve 62 back to the reservoir 58 through a pipe 70 which contains a manually operable shut-off valve 71. A branch pipe line 72 extends from the pipe 66 to a metering device 75, this metering device being connected with the spindle 50 by any suitable means such as a belt 76 connecting a pair of pulleys 77 and 78 which are respectively mounted on the spindle 50 and the shaft of the metering device. When the valve 71 is opened, the oil discharged from the cylinder 54 through the pipe 66 flows directly into the reservoir 58. When the valve 71 is closed, the oil discharged from the cylinder 54 is compelled to flow through the metering device 75, the rate of flow of oil through this device being determined by the setting of an adjusting handle 80 and by the speed of rotation of the spindle 50 to which the metering device is connected. The metering device is adapted for use in regulating the feeding motion of the piston 55 by definitely limiting the rate of discharge of oil from the cylinder 54 through the pipes 65 and 66, an excess of oil under pressure being meanwhile supplied through the pipes 61 and 64 to the further end of the cylinder. The valve 62 is of a well known type capable of connecting the supply pipe 61 with either one of the pipes 64 or 65, according to the position of the handle 63, the discharge pipe 66 being at the same time connected with the other of these two pipes.

Mounted on the saddle 52 is a turret 81 which carries a plurality of tools for successive cutting operations on the work. Near the right hand end of the lathe, as viewed in Figure 1, a cross frame 82 is mounted, as shown in Figure 2. According to this figure, two cylinders 54 may be employed, each cylinder containing a power piston movable to drive the saddle. Since these two cylinders are connected in parallel and operate identically, and since the saddle can be driven by a single piston instead of two, only one cylinder and piston is hereinafter specifically described. On the cross frame 82 is mounted a collar 90 through which extends the reduced intermediate portion of a spool 91. From the left hand end of the spool projects a back stop member 92, which, as indicated in Figure 11, is provided with a pair of jaws 93 adapted to receive the end 94 of a back stop bar carried by the saddle. This back stop bar is connected to mechanism well known in the art for turning the turret 81 when the back stop bar 94 engages and is arrested by the back stop 92 during the movement of the saddle away from the work. After the back stop bar has engaged the back stop, the further motion of the saddle away from the work results in the turning of the turret through a definite angle to present the next successive tool for operating engagement with the work. As shown in Figure 9, the spool 91 is axially movable in the collar 90 through a short distance, of the order of $\frac{1}{16}$ of an inch. Mounted in the collar 90 are springs 95 which press against a flange portion 96 of the spool 91 and tend to hold this spool resiliently toward the left, that is, toward the work. To the right of the collar 90 a portion 97 of the spool projects, there being a shoulder 98 between this portion and the reduced intermediate portion within the collar 90, the shoulder 98 normally bearing against an end of the collar and limiting the leftward movement of the spool. A lateral groove 100 is provided in the spool portion 97, as indicated in Figure 4. In this groove rides a pin 101 carried at one end of a rocking lever 102 which as shown is rockably mounted near its midpoint on a shaft 103 carried by a bracket 104 projecting from the side of the cross frame 82. To the lower end of the rocking lever 102 is pivotally connected a link 105, one end of this link being forked as at 106 to receive an intermediate portion of a lever arm 110 which is pivotally mounted within this forked end of the link by a vertical pin 111 extending through both arms of the fork and through the lever 110. The pivot pin 111 extends through the arm 110 at a point adjacent to one end thereof at which the arm is pivotally attached, as by a vertical pin 112, to a lug projecting from a clamping block 113. The clamping block 113, as shown in Figures 2 and 3, receives a number of stop bars 115 therethrough, each stop bar being adjustably secured therein by one of a number of suitable set screws 116 extending through the top of the block, the bars being additionally secured as a group by a pair of lateral set screws 117. After the set screws 116 and 117 have been set up, axial movement of any one of the stop bars results in movement of the clamping block 113. Each of the stop bars 115 is provided with a lug or notch at its end remote from the clamping block 113 for engagement by a member carried by the saddle 52, the bars 115 being individually adjusted in the clamping block 113 to limit the successive strokes of the saddle toward the work during the several cutting operations. The clamping block 113 is supported loosely on a bolt 118 which projects from the side face of the cross frame 82. This bolt 118 may have a head 119 sufficiently spaced from the cross frame 82 to permit a slight movement of the block 113 toward or from the work. A pair of adjustable springs 120 may be provided to press the block 113 away from the cross frame 82. As hereinafter more fully set forth, movement of either the spool 91 or the block 113 from the respective positions illustrated in Figure 2, results in a rocking of the lever 110 and in the actuation of valve mechanism attached to the remote end of this lever as hereinafter described.

As shown in Figure 1, a valve casing 125 is mounted adjacent to the end of the cylinder 54 remote from the work. The supply and discharge pipe 64 from the valve 62 leads to this casing. A relief pipe 126 connects this casing directly with the reservoir 58. As indicated in Figure 6, the casing 125 may be in the form of a block having a bore therethrough enlarged at spaced points by a series of three annular channels 130, 131 and 132, projecting radially from this central bore. Within the bore is snugly fitted a tubular liner 133 which is in the form of a hollow cylinder having lateral ports 134 communicating with the annular channel 130, lateral ports 135 communicating with the channel 131 and lateral ports 136 communicating with the channel 132. The position of these lateral ports may be accurately determined in the tubular member 133 before the latter is fitted into the bore of the casing 125. Suitable end caps 140 and 141 are secured over the ends of the tubular member 133 to hold the same tightly and accurately in place and to prevent leakage from the bore. These caps 140 and 141 are each provided with central bosses 142 which are bored coaxially with the liner 133 to receive a valve stem 150, each of the bosses 142 being provided with a suitable fluid-tight packing 143 around the valve stem 150. Integral with the valve stem is a valve slide member 151 which is slidably fitted within the liner 133. As indicated in Figures 11 and 12, the valve slide 151 is movable to close the ports 136 or the ports 135. The channel 130 is constantly in communication with the supply and discharge pipe 64. The channel 131 is in constant communication through a duct 144 with the chamber 640. The channel 132 communicates with the relief pipe 126 through a duct 145 and a valve chamber 152 between which is a spring-pressed valve 153. If two cylinders 54 are provided, as shown, the corresponding end chambers may be in constant communication through suitable connecting pipes 155. The channel 130 which communicates with the pipe 64 also communicates with a passage 156 in the casing 125, this passage leading to the duct 144 through a valve chamber 157 in which is a one-way check valve 158 to permit substantially unobstructed flow of oil from the channel 130 to the chamber 640, regardless of the position of the slide valve 151, but to prevent flow in the reverse direction through the passage 156. In order to provide freedom of movement of the valve member 151 within the bore of the liner 133 and to avoid the trapping of oil in the right hand end of this bore, I may provide the valve stem with a central bore 160, this bore being preferably closed at both ends but opening laterally into the chamber within the liner 133 between the valve member 151 and the cap 141, through ports 161. Other lateral ports 162 open from the central bore 160 of the valve stem at a point to the left of the valve member 151. As it is desirable to keep the channel 132 shut off from the other channels except when the valve member 151 is moved sufficiently far toward the right to open up the ports 136, I provide an auxiliary valve member 163 to the right of the lateral ports 162. The member 163 forms a chamber in the left hand end of the liner 133, which is in communication with the right hand end of the liner but is cut off from communication with the channels 130 and 131. On the right hand end portion of the valve stem which projects through the cap 141, is adjustably mounted a cup-shaped abutment member 165. This member telescopes over the stuffing box on the cap 141 as the valve stem moves to the left, until the rim 166 of the cup engages the face of the cap 141, thus providing a positive and adjustable limit for the movement of the valve stem 150 toward the left. By this means, the throttling of the ports 135 may be accurately determined and easily adjusted.

In operating the lathe, the handle 63 may be swung to the right at the end of a cutting operation so as to connect the pressure supply line 61 with the connecting line 65 leading to the chamber 650. This causes the oil to press against the piston 55 in such a manner as to move the saddle toward the right. As there is little resistance to such motion, it preferably takes place at a relatively high speed, especially as a considerable portion of the chamber 650 is occupied by the piston rod 56. When the saddle has travelled far enough to the right to bring the back stop bar 94 up against the back stop 92, the pressure of the back stop bar against the back stop will move the spool 91 toward the right to the position indicated in Figure 11. This movement of the spool 91 rocks the lever 102 on its fixed fulcrum 103, the link 105 thus being moved toward the left. Since at this time the pivot pin 112 is stationary, the movement of the pin 111 toward the left will swing the entire arm 110 toward the left about the pivot pin 112. This results in a movement of the valve member 151 toward the left a sufficient distance to throttle or close the ports 135, the limit of this throttling motion being accurately determined by the adjustable cap 165. This throttling of the ports 135 restricts the escape of oil from the chamber 640. As the pump is still pumping oil at the usual rate, the excess oil which cannot enter the chamber 650 owing to the slowing down of the piston, spills through the spring-pressed relief valve (not shown) adjacent to the pump. This constriction of the ports 135 retards the remainder of the travel of the saddle toward the right, this portion of the travel resulting in the turning of the turret to present the next successive tool for operation on the work.

When the turret has been turned and indexed, the operator shifts the handle 63 to the left, as shown in Figure 1, this position of the valve sending the oil into the chamber 640 so as to move the saddle toward the left. When the tool is in position to commence cutting, the valve 71 is closed to regulate the feeding speed by sending the oil through the meter 75. When the tool has finished its cutting operation, the saddle or some member carried thereby engages one of the stop bars 115 and moves it, together with the other stop bars and the clamp block 113, a short distance toward the left until the block brings up against the side face of the cross frame 82 as shown in Figure 12. At this time, the spool 91 and hence the pin 101 are stationary. Since the pin 103 is also stationary, the lever 102 is not moved by the movement of the block 113. The lever 102 being stationary, it follows that the link 105 and the pin 111 carried thereby are also stationary so that the pin 111 serves as a fulcrum for the arm 110. Thus the movement of the block 113 toward the left swings the remote end of the arm 110 toward the right, this resulting in a movement of the valve member 151 toward the right to a position such as illustrated in Figure 12. This uncovers the ports 136 and provides a connecting passage from the cylinder 54 to the channel 132. As hereinbefore set forth, the channel 132 communicates with the return pipe 126 through a valve chamber 152 which is closed by a spring-pressed valve 153, the spring being weaker than the relief valve spring associated with the pump. Thus engagement of the saddle with a stop bar opens the chamber 640 into the channel 132 through which oil may escape past the valve 153 and through the return pipe 126 to the reservoir 58, thus relieving in large measure the pressure in the chamber 640. The spring-pressed valve 153 is preferably adjusted so as to leave sufficient pressure in the chamber 640 to hold the tool firmly against the work, but at the same time to avoid excessive pressure on the saddle which might be harmful to the stop bars.

Having thus described an embodiment of my invention, I desire it to be understood that the description is given by way of illustration and not limitation, and that the invention embraces such modifications of form and structure as fall within the scope of the following claims.

I claim:—

1. A machine comprising a reciprocable member, hydraulic means for moving said member, said hydraulic means including a driven member operatively connected with said reciprocable member, means for supplying power fluid thereto under pressure, and a fluid discharge duct; and mechanism for automatically reducing the speed of travel of said reciprocable member at a predetermined point of its stroke, said mechanism including means for constricting said discharge duct.

2. In a turret lathe having a saddle, cylinder-and-piston means for moving said saddle, means for supplying power fluid into one end portion of said cylinder to move said saddle away from the work, a discharge line from the opposite end portion of said cylinder, a spring-pressed relief valve operatively connected with said supply means, and means operable to constrict said discharge line automatically when said saddle reaches a predetermined point in its travel away from the work.

3. In a turret lathe having a reciprocable saddle, a back stop, means for turning said turret including a back stop bar adapted to engage said stop, and hydraulic means for reciprocating said saddle; mechanism for automatically reducing the speed of travel of the saddle away from the work when the turret begins to turn, said mechanism comprising a displaceable member carrying said back stop and means operable by movement of said member to reduce the discharge flow of power fluid from said hydraulic means.

4. In a turret lathe having a movable saddle, a fixed cylinder, a piston movable in said cylinder and attached to said saddle, and means for supplying power fluid under pressure into the end portion of the cylinder adjacent to the work, a valve casing having a chamber communicating with the end portion of the cylinder remote from the work, a supply and discharge pipe leading to said casing, a valve in said casing providing a normally open port between said chamber and said pipe, and means operable by movement of said saddle away from the work for constricting said port when the saddle reaches a predetermined point of its stroke.

5. In a turret lathe having a movable saddle, a fixed cylinder, a piston movable in said cylinder and attached to said saddle, and means for supplying power fluid under pressure into the end portion of the cylinder adjacent to the work, a valve casing having a chamber communicating with the end portion of the cylinder remote from the work, a supply and discharge pipe leading to said casing, a valve in said casing providing a normally open port between said chamber and said pipe, means operable by movement of said saddle away from the work for constricting said port when the saddle reaches a predetermined point of its stroke, a by-pass connecting said pipe and said chamber, and a one-way check valve in said by-pass adapted to prevent discharge of fluid from said cylinder to said pipe through said by-pass.

6. In a turret lathe having a movable saddle, hydraulic means including a fluid discharge line for moving said saddle away from the work, and mechanism for automatically reducing the speed of movement of said saddle away from the work at a predetermined point in the stroke of said saddle, said mechanism including a valve casing having therein a bore and a pair of chambers communicating with said bore, said chambers and bore being a part of said discharge line, a valve member slidably fitted in said bore and movable to cut off one of said chambers from said bore, means operable by movement of said saddle for actuating said valve member to cut off said chamber, and adjustable means for positively limiting the extent of the cutting-off movement of said valve member.

7. In combination with a fluid motor consisting of a cylinder and a piston reciprocable therein, a supply and discharge duct communicating with one end of said cylinder, a relief passage communicating with said duct, and a valve normally shutting off said passage from said duct, said valve being movable in one direction to block said duct and in another direction to connect said duct and passage.

8. In combination with a fluid motor consisting of a cylinder and a piston reciprocable therein, a supply and discharge duct communicating with one end of said cylinder, a relief passage communicating with said duct, a valve normally shutting off said passage from said duct, said valve being movable in one direction to throttle said duct and in another direction to connect said duct and passage, and means for automatically moving said valve when said piston reaches predetermined points in its travel.

9. A turret lathe comprising a saddle, stop bars engageable by said saddle, a fluid motor for imparting feeding movement to said saddle, means for supplying fluid under pressure to said motor, and mechanism including a relief valve automatically operable by movement of any of said stop bars to relieve the pressure in the supply means.

10. A turret lathe comprising a saddle, stop bars engageable by said saddle, a fluid motor for imparting feeding movement to said saddle, means for supplying fluid under pressure to said motor, and mechanism automatically operable by movement of any of said stop bars to relieve the pressure in the supply means, said mechanism including a relief passage and a spring-pressed valve in said passage.

11. A turret lathe comprising a saddle, stop bars engageable by said saddle, a fluid motor for imparting feeding movement to said saddle, means for supplying fluid under pressure to said motor, and mechanism automatically operable by movement of any of said stop bars to relieve the pressure in the supply means, said mechanism including a relief passage, a spring-pressed valve in said passage, and a control valve movable to open said fluid-supply means into said passage.

12. In a turret lathe having a saddle, stop bars engageable by said saddle, a fluid motor for imparting feeding movement to said saddle and means for supplying fluid under pressure to said motor; mechanism for relieving the pressure of the supply fluid when said saddle engages one of said stop bars, said mechanism comprising a relief duct communicating with said fluid-supplying means, a valve normally shutting off said duct from said fluid-supplying means, and means responsive to movement of said stop bars to operate said valve to connect said relief duct with said fluid-supplying means.

13. In a turret lathe, a saddle, a fluid motor for reciprocating said saddle toward and from the work, stop bars engageable by said saddle at the end of feeding motions, a back stop engageable by said saddle in its reverse movement, fluid supply and discharge means connected to said motor, said means including a supply and discharge pipe to supply fluid for feeding motion of said saddle and to discharge fluid from said motor when the saddle is moving in the reverse direction, a valve casing having a passage between said pipe and motor, a relief duct leading from said casing, a valve movable in said casing in one direction to throttle said passage and duct, mechanism operatively connecting said valve with said stop bars and said back stop for actuation thereby.

14. In a machine tool or the like the combination of a translatable carrier, a turret thereon, hydraulically actuated means for advancing and retracting said carrier, means actuated by said carrier during retraction thereof for indexing said turret, and means automatically operable to retard the movement of said carrier during retraction thereof and prior to the action of said indexing mechanism.

15. In a machine tool or the like the combination of a translatable member, hydraulically actuated means for advancing and retracting said member, mechanism actuated by said member during retraction thereof, and means automatically operable to retard the movement of said member during retraction thereof and prior to the action of said mechanism.

GEORGE A. PERRY.